United States Patent
Bityutskiy

(10) Patent No.: US 11,941,998 B2
(45) Date of Patent: Mar. 26, 2024

(54) METHOD FOR MEMORIZING FOREIGN WORDS

(71) Applicant: Andrey Yakovlevich Bityutskiy, Smolensk (RU)

(72) Inventor: Andrey Yakovlevich Bityutskiy, Smolensk (RU)

(73) Assignee: Andrey Yakovlevich Bityutskiy, Smolensk (RU)

( * ) Notice: Subject to any disclaimer, the term of this patent is extended or adjusted under 35 U.S.C. 154(b) by 540 days.

(21) Appl. No.: 17/287,881

(22) PCT Filed: Oct. 17, 2019

(86) PCT No.: PCT/RU2019/050187
§ 371 (c)(1),
(2) Date: Apr. 22, 2021

(87) PCT Pub. No.: WO2020/096496
PCT Pub. Date: May 14, 2020

(65) Prior Publication Data
US 2021/0398451 A1    Dec. 23, 2021

(30) Foreign Application Priority Data
Nov. 8, 2018  (RU) .................... 2018139452

(51) Int. Cl.
*G09B 19/06*       (2006.01)
*G06F 40/58*       (2020.01)
(Continued)

(52) U.S. Cl.
CPC ............. *G09B 19/08* (2013.01); *G06F 40/58* (2020.01); *G09B 5/06* (2013.01)

(58) Field of Classification Search
CPC .......... G09B 19/06; G09B 19/08; G09B 5/06; G09B 5/065
(Continued)

(56) References Cited

U.S. PATENT DOCUMENTS 3,369,308 A * 2/1968 Curran ................... G09B 5/062
434/318
4,170,834 A * 10/1979 Smart ..................... G09B 19/06
434/157
(Continued)

FOREIGN PATENT DOCUMENTS

RU          2436169 C2    12/2011
RU          2479867 C2     4/2013
UA            90224 C2     4/2010

*Primary Examiner* — Kurt Fernstrom
(74) *Attorney, Agent, or Firm* — Muncy, Geissler, Olds & Lowe, P.C.

(57) ABSTRACT

The invention relates to methods for memorizing words in a foreign language. A method provides for the rendition of a foreign song and the synchronous presentation of textual subtitles on a display. The subtitles are produced on the display in the form of blocks placed one underneath another, each of which comprises a fragment of the text of the song and consists of three separate lines: a line containing the text of the song in the foreign language, a line containing the text of a translation into a native language, and a line containing the phonetic transcription of the words of the foreign song in the alphabetic characters of the native language, said line being the middle line in the block. The block is split into columns, each of which includes one word or phrase of the text fragment for the line containing the text of the song in the foreign language.

5 Claims, 2 Drawing Sheets

(51) Int. Cl.
*G09B 5/06* (2006.01)
*G09B 19/08* (2006.01)

(58) Field of Classification Search
USPC .......................................................... 434/157
See application file for complete search history.

(56) References Cited

U.S. PATENT DOCUMENTS

| | | | | |
|---|---|---|---|---|
| 5,433,609 A | * | 7/1995 | Deaver | G09B 19/06 434/156 |
| 5,713,739 A | * | 2/1998 | Yu | G09B 3/04 434/157 |
| 5,810,598 A | * | 9/1998 | Wakamoto | G09B 5/065 434/156 |
| 6,341,958 B1 | * | 1/2002 | Zilberman | G09B 19/06 434/157 |
| 6,370,498 B1 | * | 4/2002 | Flores | G06F 40/45 715/264 |
| 6,438,515 B1 | * | 8/2002 | Crawford | G09B 19/06 704/5 |
| 6,890,180 B2 | * | 5/2005 | Sterns | G09B 19/08 434/156 |
| 7,524,191 B2 | * | 4/2009 | Marmorstein | G09B 7/00 434/157 |
| 8,135,574 B2 | * | 3/2012 | Weikel | G06F 40/45 704/7 |
| 8,943,404 B1 | * | 1/2015 | Mager | G09B 19/00 715/256 |
| 10,283,013 B2 | * | 5/2019 | Cortes | G09B 5/065 |
| 11,024,199 B1 | * | 6/2021 | Treves | G09B 5/02 |
| 11,109,111 B2 | * | 8/2021 | Selfors | H04N 21/47217 |
| 11,455,476 B2 | * | 9/2022 | Almond | G06F 40/51 |
| 2009/0023119 A1 | * | 1/2009 | Breidner | G09B 5/06 434/157 |
| 2009/0291419 A1 | * | 11/2009 | Uekawa | G09B 19/06 434/185 |
| 2010/0233661 A1 | * | 9/2010 | Franzblau | G09B 5/02 434/178 |
| 2011/0020774 A1 | * | 1/2011 | Nguyen | H04N 5/445 434/157 |
| 2012/0115112 A1 | * | 5/2012 | Purushotma | G09B 5/06 434/157 |
| 2013/0130212 A1 | * | 5/2013 | Dohring | G09B 19/06 434/167 |
| 2022/0051588 A1 | * | 2/2022 | Kehoe | G09B 19/06 |

* cited by examiner

METHOD FOR MEMORIZING FOREIGN WORDS

TECHNICAL FIELD

The invention relates to methods for memorizing words in a foreign language by audio-visual transmission of information using a multimedia device. The invention may be used by vocalists (singers) to facilitate memorization of the lyrics of a foreign song while widening the repertoire, as well as as one of the stages of learning a foreign language in terms of mastering the perception of live oral foreign speech and expanding foreign vocabulary.

BACKGROUND ART

There is a known method of memorizing words when teaching a foreign language by the method of A. Dragunkin (А.Драгункин ,Учебная хрестоматия англо русских параллельных текстов С Петербург , 2002/A. Dragunkin, Educational Reader of English-Russian Parallel Texts, St. Petersburg, 2002).

The disadvantage of this method is that information about a foreign phrase is provided to the learner in text form. As a result, the learner lacks information related primarily to oral speech, which cannot be imparted using text. This is, first of all, information about the tempo of foreign speech, its volume, intonation, melody, accentuation of letters in words and words in a sentence, accent features of pronunciation, about possible changes and the rate of these changes in the process of pronunciation. The consequence of these drawbacks is the fact that during training a person reliably learns only the text (visual) spelling of foreign words. And so the learner memorizes the sound pronunciation of foreign words on the basis of his/her idea of how these words should sound in living foreign speech. In this way, mistakes in learning are possible, requiring correction of the acquired knowledge at the moment when the learner is faced with real oral foreign speech. The process of correcting the knowledge is long and labour-intensive.

There are known methods of memorizing words by listening to foreign songs while watching subtitles.

In particular, the use of triple subtitles is known: subtitles with a transcription of a foreign phrase, subtitles with a translation of the foreign phrase into the language that the learner speaks and subtitles for recording the foreign phrase in the language in which the song sounds (refer to the web site www.englishonlinefree.ru).

The use of this method has significant drawbacks, consisting in the need for preliminary learning of the words of the song based on the lyrics to the song, as well as preliminary knowledge of the transcriptional alphabet and transcriptional language, implying, among other things, both knowledge of the phonetics of the foreign language and the pronunciation rules, including phonemes absent in the native language of the learner. Furthermore, the section with translations of some foreign words, taken out of the parafoveal field of view, leads to the need to search for the required words and phrases on the device screen in places other than the locations of the actual subtitles themselves, takes a significant amount of time compared to the recording time of the foreign phrase and makes it virtually impossible to carry out training at the time of the sounding of the song.

The article by Geza Kovacs (Stanford University Stanford, CA, USA) and Robert C. Miller (MIT CSAIL Cambridge, MA, USA) *Smart Subtitles for Vocabulary Learning/ In Proceedings of the SIGCHI Conference on Human Factors in Computing Systems (CHI T4)*, 2014 describes possible options for using subtitles when memorizing foreign words. The authors suggest so-called "smart" subtitles, which are proposed to be shown together with audio and video materials. The subtitles feature a line with a description of the phonetic form in the learner's language, a line with a translation and a line with the original speech. This solution is the closest analogue of the claimed invention.

The disadvantage of the closest analogue, as well as other similar solutions, is the impossibility of identifying the meaning of a foreign word at the time of the sounding of a foreign phrase by reason of the person's limited abilities to search and perceive information in limited time intervals and when located outside the parafoveal visual field. This is due to the arrangement of standard triple subtitles, through which it is extremely difficult to understand the meaning of individual words at the moment the song is played. It is related to the fact that the learner is not given the opportunity to facilitate understanding of the relationship between a foreign word and its translation in the context of a song. And the need for a person to perform additional actions with a mouse type manipulator or with a keyboard to obtain explanatory information dramatically increases the time to obtain the required information. The listed factors result in the impossibility of obtaining a sufficient amount of information about the translation of a word directly at the time the foreign phrase is played.

DISCLOSURE OF THE INVENTION

The objective of the invention is to eliminate the above-mentioned disadvantages of analogues and to develop a method for memorizing foreign words directly at the time the song is played without need to learning first the phonetics of the foreign language. Additional objectives of the invention are to reduce the time for memorization, to reduce the number of repeated listening to the song until the text of the song is fully learned, and to increase the number of memorized foreign words after listening to the song.

The technical result of the invention is the increase in the amount of assimilated information transmitted in audio-visual form directly at the time of playing the song, expressed in the number of memorized foreign words after listening to the song once and/or N times, as well as decrease in the time needed to memorize foreign words.

The specified technical result is achieved by the fact that the method of memorizing foreign words using a multimedia device includes playing a foreign song by sound means of a multimedia device and synchronously demonstrating on the display of the multimedia device text subtitles related to words to the foreign song and including the lyrics to the song in the foreign language, translation of the lyrics to the song in the native language and recording of the pronunciation of the words to the song in the characters of the native language alphabet. In doing so, the subtitles are displayed simultaneously in the form of blocks arranged one below the other, each of which contains a fragment of the song lyrics and consists of three separate lines: a line of the text of the song in a foreign language, a line of the text of the translation into the native language and a line of the pronunciation of words to the foreign song in the characters of the native language alphabet that corresponds to the middle line. The aforesaid block is divided into columns, in each of which one word or phrase of the line of text of the song in the foreign language is aligned with the translation and pronunciation of this word or phrase in the translation line and the pronunciation line, respectively. Adjacent columns of the same block are visually separated from each other in at least one way selected from the group that includes making adjacent columns with different font characteristics, making adjacent columns on a different background, making borders of adjacent columns with different characteristics, and animating one of the columns. The line of the pronunciation of the words to the song in the characters of the native language alphabet is visually distinguished in relation to other lines in at least one way selected from the group that includes making a line with different font characteristics, making a line on a different background, making the line borders with different characteristics. During playback, the current subtitle block is visually separated from other blocks in at least one way selected from the group that includes dynamically changing the block's font characteristics, changing the block's background, highlighting the block's border, and animating the block. Moreover, at least one listening to the song shall be carried out with synchronous repetition of the lyrics out loud while following the subtitles in such a way that during the sounding of the words recorded in the block, visual attention would be concentrated separately on each column of this block, as well as entirely on the pronunciation line of the block.

In addition, according to particular embodiments of the invention:

- subtitles are displayed in such a way that the line of the text of the song in a foreign language is the top line of the block, and the translation line into the native language is the bottom line of the block;
- while watching subtitles during the sounding of a block, additional visual attention is concentrated entirely on the translation line of the block;
- while watching subtitles while the block is playing, additional visual attention is concentrated entirely on the line of the text of the song in the foreign language of the block;
- while playing back in the intervals between fragments of the blocks, the subtitles of the previous and/or the next block are watched.

The differences of the claimed invention from the known prior art are in the use of a different algorithm in terms of the visual transmission of information to the user of the multimedia device through the application of a special layout and structure of text subtitles, which, in combination with the use of audio material, enables the learner to acquire a larger amount of information in a foreign language at the moment of the playback of the material and, as a result, to reduce the time of memorizing foreign words. It should be noted that these differences lie not only in the features of the visual presentation of information, but also characterize a different algorithm of the learner's actions when perceiving this information, which together makes it possible to achieve the claimed technical result.

DETAILED DESCRIPTION OF EMBODIMENTS OF THE INVENTION

Figure 1:
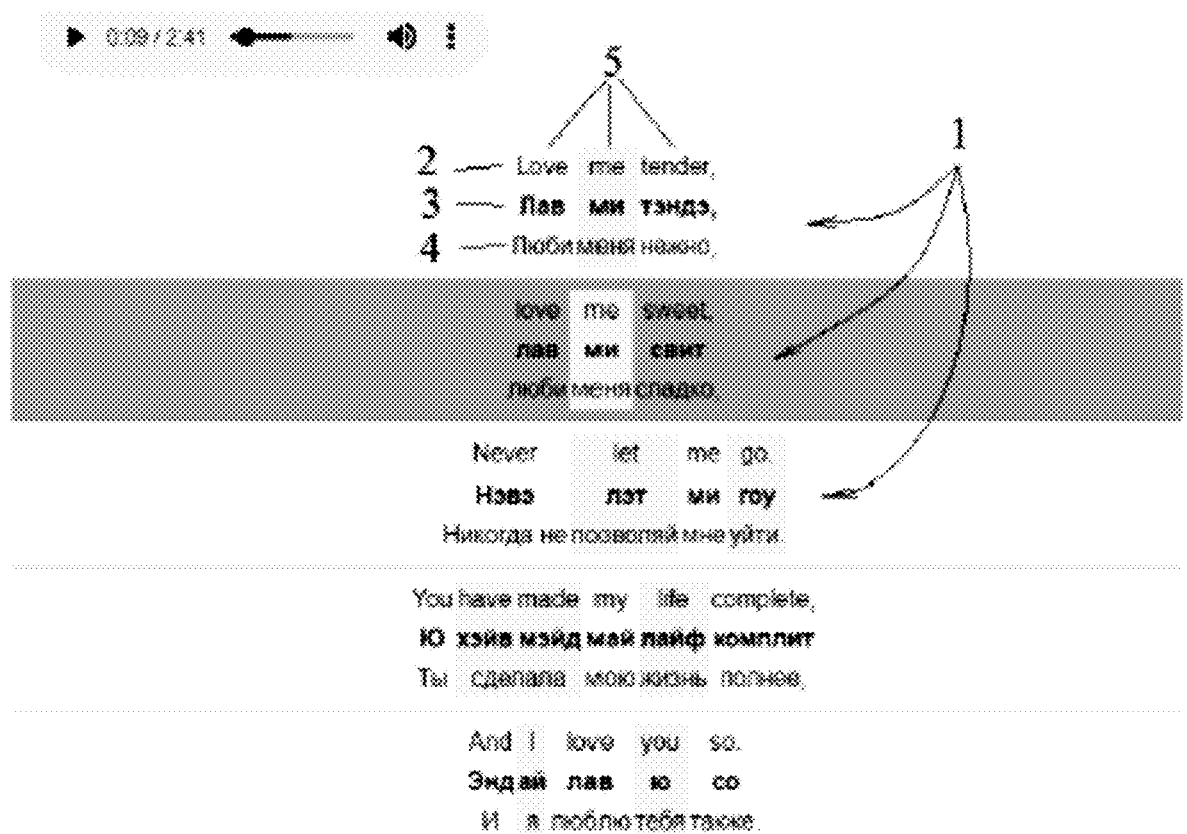
FIG. 1 shows a possible view of the interface of the multimedia device for implementing the claimed method.

It is known that a person's abilities have very specific parameters both with respect to the volume of memorized information, and to the rate of response to an external stimulus and the possibility of perceiving the presented external information. For example, a person's ability to memorize an information that was showed one time for a short period, on average, is from 5 to 9 units of information (which corresponds to the number 7±2) (Козубовский В. М., Общая психология: познавательные процессы, Минск, 2008, стр. 153/Kozubovsky V. M., General Psychology: Cognitive Processes, Minsk, 2008, p. 153). For a learner who is unfamiliar with the phonetics of a foreign language, in which the studied song sounds, this type of information will be the phonemes and syllables of the foreign speech. As a result, with a single presentation, a person is able to memorize phrases with a duration of about 5-9 syllables or about 2-4 foreign words.

At the same time, despite the fact that the size of a person's immediate memory is limited to seven units of information, its actual size can be significantly expanded due to "enlargement" or division into large blocks—coding of individual units in larger units. But this cannot happen until some information from the long-term internal memory is activated. As soon as there has been a comparison of the incoming elements and their representations in long-term internal memory, extensive knowledge helps the person to systematize the seemingly incoherent material. (Солсо Р. Когнитивная психология, Спб, 2006, стр. 233/Solso R. *Cognitive Psychology*, St. Petersburg, 2006, p. 233). For such a systematization in the learning of the words of a foreign song, words will appear as a combination of disparate phonemes, and sentences, as a combination of individual words. However, the main obstacle for the implementation of this type of action for the student is the fact that foreign speech is just one of the methods of coding information, and in order to obtain a decryption of this information, the learner must be provided with these explanations, ensuring their availability or comprehensibility, and also a time interval should be provided so that the person can perceive and understand the explanations. Herewith, for the case of learning the words to a foreign song directly at the moment of playing back the song, one of the limiting factors is the time given to the learner to obtain the necessary explanatory information.

This time is limited by the rate of live foreign speech and is about 300-500 milliseconds per word. The required time intervals may be significantly increased in the case of learning the words to a foreign song not at the moment of its sounding, but beforehand, without musical accompaniment. However, in this case, the learning process degenerates into a standard procedure for learning foreign words and phrases and has its own well-studied advantages and disadvantages.

These include the duration and complexity of training, the need for a long stage of learning the phonetic structures of the language and learning individual foreign words, grammatical structures and rules. Obtaining a significant result, consisting in the ability to perceive a live foreign speech, is achieved either by a large number of classes, or after a long (weeks and months of classes) period of time.

Meanwhile, the musical component plays an important role in mastering oral foreign language speech, since it rules out mechanical repetition of linguistic and speech models, replacing it with an emotionally coloured process of mastering lexical, grammatical and phonetic material. At that, rhythmic musical or song material is perfectly perceived, and the systematic repetition of the same rhythmic patterns creates strong conditioned reflex links that contribute to the formation of a favourable state of the body for receiving and consolidating information. The presentation of rhymed lexical material with the use of a musical component ensures a stronger memorization, and numerous repetitions characteristic of the song genre contribute to easy and involuntary memorization (Саакян С. А. «Использование музыкального компонента как эффективного средства овладения младшими школьниками устной иноязычной, речи», диссертация на соискание ученой степени кандидата педагогических наук, Москва, 2015, стр. 34, 37, 38/Sahakyan S. A. *Using the Musical Component as an Effective Means of Mastering Oral Foreign Language Speech by Junior Schoolchildren*, thesis for a candidate degree in pedagogical sciences, Moscow, 2015, pp. 34, 37, 38).

With the favourable influence of music, the amount of stored information is significantly expanded and has a longer storage period. At the same time, music is not only a favourable factor for enhancing brain activity and improving memorization, but also acts as an intonation contour, which is usually very similar to the intonation contour of oral speech that sounds in a song. This certainly makes it easier to memorize words during a song, especially in comparison with the same memorization of words not accompanied by music.

Thus, learning the words to a song while playing back the song is more effective and allows to reduce the time for learning the words of the song and to improve the memorization of unfamiliar foreign language material.

It should be noted that speech information, like any other auditory process, is a time-stretched process, which leads to the fact that for a learner loaded with a large amount of unfamiliar information, including both phonetics and vocabulary, grammar and translation of a foreign phrase, it will be difficult to keep the entire phrase in memory from beginning to end. As a rule, the beginning and end of the phrase are well remembered, which leads to a significant loss of information and the impossibility of understanding, grouping and memorizing it.

Special attention should be paid to the fact that, in addition to short-term memory with a relatively small size of information storage, a person also has instant (sensory) memory that retains information perceived by the sense organs without processing it and has a maximum size, but a relatively short information storage time (Козубовский В. М., Общая психология: познавательные процессы, Минск, 2008, стр. 153/Kozubovsky V. M., *General Psychology: Cognitive Processes*, Minsk, 2008, p. 153).

Thus, Sperling's experiments showed that the size of immediate, sensory visual or echoic memory can contain more information than a person can remember, and the duration of echoic storage is approximately equal to 250 ms. Equivalent experiments carried out by Neiser with regard to sound or echoic memory have shown similar, substantially larger than the possible to memorize sizes of immediate sound memory and the duration of echoic storage equal to about 1-2 seconds. (Солсо Р. Когнитивная психология, Спб, 2006, стр. 102-106/Solso R. Cognitive Psychology, St. Petersburg, 2006, pp. 102-106).

It can be concluded from the foregoing that the learner has a time interval of about two seconds after the playback of a foreign phrase or word, during which the learner stores the maximum information about this foreign phrase, and it is at this moment that the explanation of the meanings of foreign words (and foreign phonetics) will be maximum effective for grouping and memorization. And the repeating out loud the heard foreign phrase by the learner involves the maximum number of types of memory, including motor, auditory and visual types of memory.

Explanations (clarification) may be provided in visual or auditory form. At the same time, it is obvious that the visual form has significant advantages over the auditory one due to substantially larger amount of information provided, as well as substantially shorter time required for its perception (the image can be perceived in a fraction of a second, moreover, immediately at the moment of playing back the foreign phrase, and sound explanations have the duration of the playback and may be given after the playing of the foreign phrase is completed).

To maximize the effect of the explanatory information, it is necessary that an amount of data be presented is as small as possible (so as not to overload the brain and not distract with unnecessary information), but at the same time the learner is provided with all the necessary information to answer most of the questions that arise while listening to this phrase.

These principles formed the basis of the claimed method, which provides for the use of a multimedia device that ensures the transfer of audio-visual information to the learner concerning the memorized foreign words.

According to the invention, simultaneously with the playback of a foreign song, a synchronous demonstration of subtitles on the display of the device is carried out in the form of blocks (1) arranged one above the other, each of which includes three subtitle lines: a line (2) of the text of the song in a foreign language (hereinafter referred to as a foreign text line), a line (3) for the pronunciation of words to the foreign song in the characters of the native alphabet (hereinafter referred to as the pronunciation line) and a line (4) for the translation into the student's native language (hereinafter referred to as the translation line). For ease of perception, it is important that the pronunciation line (2) be located in the middle of the block (1). In this case, the preferred from the point of view of ease of perception is the arrangement of lines, at which the foreign text line (2) is the top line of the block, and the translation line (4) is the bottom line (see FIG. 1). However, it is possible to change the position of lines (2) and (4), which will also ensure the achievement of the claimed technical result.

Herewith, these blocks (1) are also divided into separate columns (5), each of which contains one word or phrase of a block (1) fragment for the foreign text line (2), and the pronunciation of this word or phrase and its translation—for the pronunciation (3) and translation (4) lines, respectively.

The content of the explanatory information of the subtitles according to the claimed invention is based on the fact that in order to maximize the effect of grouping the information unknown to the learner, contained in the foreign speech sounding in the song, it is necessary that the explanatory subtitles explain to the person the answers to two questions as clearly as possible:

what does it (each word and phrase in its entirety) mean?
how to repeat it (or the pronunciation of the sounded phrase)?

It is quite natural that these explanations should be based on the previous experience of the person in order for this grouping into functional groups to take place as efficiently as possible.

From the point of view of previous experience in relation to the pronunciation of a foreign phrase, it is necessary to use the phonetic notation of the foreign phrase in the characters of the alphabet of the language the learner speaks. In this case, the phonetic notation will play the role of a certain context in the perception of foreign speech, simplify the identification of individual words, allow the learner to get used to the melody and rhythm of foreign speech, and the phonetic text itself, written in the characters of the alphabet familiar to the learner, will be both easy to read and easy to perceive and remember. In addition, one of the functions of the phonetic notation of a foreign phrase will be some kind of relevance, binding or synchronization of translation of words with the sound of foreign speech, which is due to the fact that it is not always possible to separate the directly sounding foreign word from the rest of the words in the phrase. At the same time, according to the phonetic notation, the learner will be able to understand which word sounds at the moment and to read its translation.

At the initial stage of learning a foreign language, it is extremely important to have a clear division of continuously sounding speech into words, which are the initial semantic unit. At that, oral speech itself may not provide all the necessary information in full (pauses between words can be so small that they are practically indistinguishable). That is, the use of phonetic captions allows words to be identified.

As an answer to the learner's question "what does it mean?", word-by-word translation of the foreign speech into the learner's native language is used.

The following factors are extremely important:
- it is necessary to convey to the learner the meaning of each significant word in a foreign phrase;
- the meaning of the word should be indicated precisely in relation to the specific situation that sounds directly at the moment without bringing various meanings and interpretations, so as not to complicate the thinking process of the learner.

The format of the subtitles provided is based on the fact that the visual display of the explanatory information should ensure the easiest possible perception of the information provided.

When using multiple lines for each of the subtitle types, there is a problem of visual search for matching values for the same word, but placed in different types of subtitles (lines). Arranging information using columns (5) facilitates visual search when moving the gaze from one type of subtitle to another. The entire arrangement of subtitles (both moving the gaze horizontally (along the line) and vertically (along the columns)) is aimed at reducing the search time for information of interest to the learner. Despite the apparent simplicity, the search, in fact, takes quite a long time, which does not allow using live foreign speech that sounds in songs as educational material.

Thus, the time spent on searching for visual information provided to a person on a screen or on a page of a book may be estimated by analysing the time spent on conducting a test using Schulte tables. The Schulte table is a square of 20-25 cm in size, divided into 25 identical cells with numbers from 1 to 25 inscribed in the cells in random order. It is known that the time spent by a person to search for all the numbers included in the Schulte table is from 7 to 8 seconds for the best options, up to 25-30 seconds for trained people and a minute or more for low trained people (Андреев О. А., Техника быстрого чтения: Программа «Доминанта», Ростов н/Д: Феникс, 2005, стр. 117/Andreev O. A., Speed Reading Technique: "Dominant" Program, Rostov-on-Don: Phoenix, 2005, p. 117). Thus, the time spent on searching for one information element on a page with information provided to a person is at least 0.3 seconds, with a typical value of about 0.5 seconds for a trained person to 1-3 seconds for a low trained person. Obviously, such time intervals exceed the required 300-500 ms per word for the case of live foreign speech.

To facilitate the grouping of the subtitles presented, visual separation of adjacent elements—lines and columns—from each other is used.

Separation of columns (5) is carried out in one or more ways, providing for making adjacent columns with different font characteristics (font type, size, thickness, letter spacing, fill, colour, filling letters, font animation, etc.); making adjacent columns on a different background (by colour, transparency, ornament, animation, etc.); making the borders of adjacent columns with different characteristics (the presence of lines along the borders, their difference in colour, fill, thickness, animation, etc.); performing column animation.

To visually separate the lines (2, 3, 4) of a block (1), the middle pronunciation line (3) is highlighted, which may be carried out by making the line with different font characteristics (in relation to other lines) or on a different background, highlighting the borders of the middle line.

In addition, a visual separation of the block (1) related to the currently playing phrase from other adjacent subtitle blocks is carried out. This may also be done by changing the characteristics of the block's font, changing the background of the block, highlighting the borders of the block, or performing animation.

As an example, FIG. 1 shows one of the options for visual separation of elements, in which the middle line (pronunciation line 3) is given in bold, adjacent columns (5) have a background of different colours, and the currently played back block (1) is highlighted by changing the background.

In a particular embodiment, dynamic visual highlighting of columns that relate to the currently played back word or phrase from the song may also be used. For this, one of the above methods may be applied. In addition, column selection may be implemented using a slider indicating the currently sounding word (not shown in the figures).

The specified visual grouping will not require additional efforts to find the necessary information on the screen and will not take the time needed to switch attention, which is much less than the time mentioned earlier.

In order to achieve the maximum memorization effect, it is necessary, on the one hand, to ensure recognition of the maximum information stored in a foreign phrase at the moment of playing it back, and on the other hand, at the moment when information about the foreign phrase is stored in the sensory memory, to use the maximum number of types of memory by the type of perception. For this, it is necessary that the learner, at the moment when he/she heard a foreign phrase and realized its phonetic composition broken down into words repeat out loud what he/she heard.

As a result, the following types of memory are involved: auditory, since the phrase was heard; visual, since the learner read the text with information about the foreign phrase; motor, since the learner pronounced the foreign phrase, and his/her sound reproduction organs were involved and remembered how this sound reproduction was carried out. Moreover, the rhythms and tones of the music in the song, as well as the tonality of the performer's voice, have an emotional impact on the learner and maximize the effectiveness of memorizing information.

To transfer information to the learner, containing the maximum possible data on the semantic content of the phrase, and the dependencies of its components, and to preserve the beneficial effect of the musical and rhythmic impact of the song on the learner, he/she must focus his/her visual attention on individual elements of the subtitle block during its playback (see FIG. 2):

on each subtitle column (5) of the block,
on the pronunciation line (3) of the block as a whole,
on the translation line (4) of the block as a whole,
on the foreign text line (2) of the block as a whole.

Figures 2, 3, 4, 5, 6:
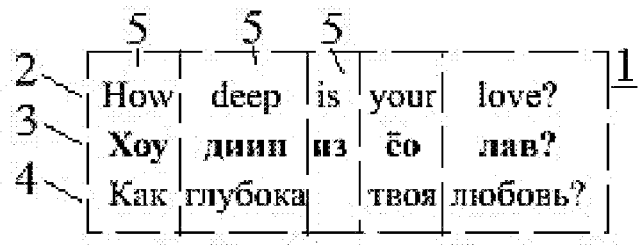
FIG. 2 shows the general view of the subtitle block.
FIG. 3 shows the view of a subtitle block when concentrating visual attention on a separate column.
FIG. 4 shows the view of a subtitle block when visual attention is concentrated on the pronunciation line.
FIG. 5 shows the view of the subtitle block when concentrating visual attention on the translation line.
FIG. 6 shows the view of the subtitle block when concentrating visual attention on the foreign text line.

Therewith, four types of perception will be involved:

1. To perceive the exact meaning of each foreign word, the learner concentrates his/her visual attention on a column, or on some selection or pointer covering foreign words with their translations for each of the types of subtitles, and from the point of view of figure-background perception, he/she will perceive the triple subtitles approximately as shown in FIG. 3.

2. When perceiving information on the pronunciation of a foreign phrase, the learner concentrates his/her attention on the corresponding subtitle line (3), and from the point of view of figurative-background perception, he/she will perceive the triple subtitles provided to him/her approximately as shown in FIG. 4.

3. When perceiving information about the translation of a foreign phrase into the native language, the learner concentrates his/her attention on line (4), and from the point of view of figurative-background perception, he/she will perceive the triple subtitles provided to him/her approximately as shown in FIG. 5.

4. When perceiving a text image in the language in which the foreign song sounds, the learner concentrates his/her attention on line (2), and from the point of view of figurative-background perception, he/she will perceive the triple subtitles provided to him/her approximately as shown in FIG. 6.

When teaching words at the initial stages, it is enough for the learner to have time to concentrate his/her attention on individual columns (5), as well as on the pronunciation line (3), while implementing the first and second memorization mechanisms. In the future, the learner will have the opportunity to additionally use the third and then the fourth memorization mechanisms.

It should be noted that when focusing attention on individual elements of the block, in addition to the information contained in these elements, the learner will also visually perceive information from other elements at the same time due to the involvement of peripheral vision mechanisms, which will enhance the memorization effect.

Beyond that, an important aspect of the provision of subtitles is the arrangement of blocks one below the other, which allows the learner to repeat the previous just-voiced fragment in the intervals between the playback of the blocks and/or to pre-study the next one, preparing for its perception.

Thus, the exclusion of any of the elements of the subtitles provided (blocks, lines, columns, their location and means of visual highlighting) will make it impossible for the learner to implement the above-described information perception algorithms, which in turn will entail a significant limitation in the learner's ability to understand an unfamiliar foreign phrase, and/or to the exclusion of one of the types of memory from the memorization process, and/or to a decrease in the amount of conscious information. All these factors significantly impair the effectiveness of memorizing information in a foreign language.

In other words, only a combination of all of the above methods of forming, presenting and transmitting audio-visual information will make it possible to achieve the efficiency of information perception, which exceeds that of the known methods of teaching foreign words using songs.

So, when information about pronunciation is excluded from perception (visually grouped by words or phrases, as described above), the foreign speech, especially with unfamiliar or illegible pronunciation, turns out to be unrecognized in terms of establishing the vocabulary and the boundaries of words. As a result, there is no initial information for memorization. The amount of memorized information in this case will not exceed 5-9 syllables of foreign words and will be easily pushed out by subsequent unfamiliar information on foreign phrases.

If the grouped information about the translation is excluded, the meaning of the translation of the played back foreign phrase will be unclear to the learner. The amount of memorized information will not exceed 5-9 syllables of foreign words and will be easily pushed out by subsequent unfamiliar information on foreign phrases.

When excluding information on writing a foreign speech, the student will not use the visual memory and the development of skills in reading texts in a foreign language.

If the possibility of visual perception of each column separately (mechanism 1) is excluded from the memorization process, the student will have no information on the meaning of each of the foreign words, and it will lead to the need to learn whole foreign phrases (with the idea of pronunciation and the meaning of the phrases), and not separate words, which is much more simple.

If during the learning process the person forgets some foreign word, he/she will be able to quickly restore his/her knowledge in a minimum time interval by using the first memorization mechanism, without the need to search in dictionaries for the meaning of this single word, which is extremely time-consuming and will significantly increase the learning process.

It should be noted that the rate of memorizing words will also be predicated on the learner's ability to see, read, comprehend and memorize textual information at a rate exceeding that of the oral speech playback by 4-5 times. Assuming a speech rate of 120 words per minute and an average word size of about 6 characters, the required reading rate is 3600 characters per minute.

Therefore, to improve the efficiency of the proposed method, it is desirable for the learner to master the skills of speed reading. These skills are formed quite quickly, even the initial stage of training in speed reading techniques involves achieving a rate of about 5000 characters per minute (Андреев О. А., Техника быстрого чтения: Программа «Доминанта», Ростов н/Д: Феникс, 2005, стр .7/Andreev O. A., Speed Reading Technique: "Dominant" Program, Rostov-on-Don: Phoenix, 2005, p. 7).

The technical implementation of the method does not present any particular difficulties and may be organized using most of the known multimedia devices capable of playing audio and equipped with a screen for displaying subtitles. A personal computer, mobile devices (smartphone, tablet, etc.), TV may be used as such multimedia devices.

The result of the use of the invention is that it becomes possible to teach the words to foreign songs to students with different levels of prior knowledge of foreign languages at the very time the song is played back. In addition, due to the involvement of the emotional aspect conditioned on the musical component, it is possible to increase the efficiency of memorizing unfamiliar foreign language material.

The invention claimed is:

1. The method for memorizing foreign words using a multimedia device, including the playback of a foreign song by the audio means of the multimedia device while demonstrating on the display of the multimedia device the text subtitles related to words of the foreign song and including the lyrics to the song in a foreign language, the text of the translation of the song into the native language and the pronunciation of the words to the song in the characters of the native language alphabet, characterized in that these subtitles are displayed simultaneously in the form of blocks arranged one below the other, each of which contains a fragment of the lyrics to the song and consists of three separate lines: the line of the text of the song in a foreign language, the line of the text of the translation into the native language and the line of the pronunciation of the words to the foreign song in the characters of the native language alphabet, which corresponds to the middle line of the block;

therewith, the aforesaid block is divided into columns, in each of which one word or phrase of the line of text of the song in the foreign language is aligned with the translation and pronunciation of this word or phrase in the translation line and the pronunciation line, respectively;

adjacent columns of the same block are visually separated from each other in at least one way selected from the group that includes making adjacent columns with different font characteristics, making adjacent columns on a different background, making borders of adjacent columns with different characteristics, and animating one of the columns;

the line of the pronunciation of the words to the foreign song in the characters of the native language alphabet is visually distinguished in relation to other lines in at least one way selected from the group that includes making a line with different font characteristics, making a line on a different background, making the line borders with different characteristics;

during the playback, the current subtitle block is visually separated from other blocks in at least one way selected from the group that includes dynamically changing the block's font characteristics, changing the block's background, highlighting the block's border, and animating the block; and at least one listening to the song shall be carried out with synchronous repetition of the lyrics out loud while watching the subtitles in such a way that during the playing of the words recorded in the block, visual attention would be concentrated separately on each column of this block, as well as entirely on the pronunciation line of the block.

2. The method according to claim 1, wherein the subtitles are displayed in such a way that the line of the text of the song in a foreign language is the top line of the block, and the translation line into the native language is the bottom line of the block.

3. The method according to claim 1, wherein when watching subtitles while the playing of the block, additional visual attention is concentrated entirely on the translation line of the block.

4. The method according to claim 3, wherein when watching subtitles while the playing of the block, additional visual attention is concentrated entirely on the line of the text of the song in the foreign language of the block.

5. The method according to claim 1, wherein when playing back in the intervals between the fragments of the blocks, the subtitles of the previous and/or the next block are watched.

* * * * *